United States Patent
Dempsey et al.

(10) Patent No.: US 6,990,856 B2
(45) Date of Patent: Jan. 31, 2006

(54) METHOD AND APPARATUS FOR DETERMINING MASS OF ENGINE INTAKE AIR WITH REVERSION COMPENSATION

(75) Inventors: David W. Dempsey, Highland, MI (US); Kenneth P. Dudek, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/461,706

(22) Filed: Jun. 13, 2003

(65) Prior Publication Data

US 2004/0250610 A1   Dec. 16, 2004

(51) Int. Cl.
*G01M 15/00* (2006.01)

(52) U.S. Cl. .................................................... 73/118.2

(58) Field of Classification Search ................... 73/116, 73/117.2, 117.3, 118.1, 118.2, 861.42
See application file for complete search history.

(56) References Cited

U.S. PATENT DOCUMENTS

| | | | | |
|---|---|---|---|---|
| 4,739,651 A | * | 4/1988 | Smith ......................... | 73/118.2 |
| 5,563,340 A | * | 10/1996 | Clowater et al. ........... | 73/202.5 |
| 5,635,635 A | * | 6/1997 | Tsukada et al. ............ | 73/118.2 |
| 6,152,102 A | * | 11/2000 | Ruman ........................ | 123/295 |
| 6,457,353 B1 | * | 10/2002 | Kanke et al. ............... | 73/117.3 |
| 6,619,140 B2 | * | 9/2003 | Kitahara et al. ......... | 73/861.52 |
| 6,629,456 B2 | * | 10/2003 | Kohno ...................... | 73/204.26 |
| 6,697,743 B2 | * | 2/2004 | Aono et al. .................... | 702/45 |
| 6,708,561 B2 | * | 3/2004 | Zurek et al. ............. | 73/204.22 |
| 2002/0045982 A1 | * | 4/2002 | Aono et al. .................. | 701/102 |
| 2003/0136196 A1 | * | 7/2003 | Wiklund et al. .............. | 73/716 |
| 2004/0093956 A1 | * | 5/2004 | Straight et al. .......... | 73/861.08 |
| 2004/0168508 A1 | * | 9/2004 | Henderson et al. ........ | 73/118.1 |

* cited by examiner

*Primary Examiner*—Eric S. McCall
(74) *Attorney, Agent, or Firm*—Christopher DeVries

(57) ABSTRACT

An engine system includes an intake manifold, and an air inlet enabling an air flow into and out of the intake manifold. An air flow sensor is attached to the air inlet, and measures a flow of air through the air inlet. A first sensor is also included, and is operable to determine a direction of air flow. The air flow sensor is in communication with a controller, which records the mass of air flow through the air inlet. In one embodiment, the first sensor is a differential pressure that detects a pressure differential. In an alternative embodiment, a second sensor communicates with the air inlet, and the first sensor communicates with the intake manifold. The first and second sensors jointly determine a direction of air flow. In yet another embodiment, an output of the first sensor is compared to a calibrated barometric pressure to determine a direction of air flow.

17 Claims, 4 Drawing Sheets

METHOD AND APPARATUS FOR DETERMINING MASS OF ENGINE INTAKE AIR WITH REVERSION COMPENSATION

FIELD OF THE INVENTION

The present invention relates to measuring air flow into an intake manifold, and more particularly to a method of measuring air flow that compensates for reversion.

BACKGROUND OF THE INVENTION

Traditional engine systems include an engine with an air intake manifold. Air flows into the intake manifold through an air inlet. An air filter filters the inlet air to remove dirt or debris. A mass air flow (MAF) sensor measures or estimates the mass of air flowing through the air inlet into the engine. The controller determines an appropriate A/F ratio for engine operation based on the MAF. A driver adjusts a throttle valve using an accelerator pedal to regulate the air flowing into the intake manifold.

Reversion is the reverse flow of engine air from the intake manifold back through the air inlet. Conventional MAF sensors are unable to detect reversion, and therefore overstate air flow during reversion. The error adversely impacts engine control. More specifically, the air expelled from the engine during reversion is measured by the MAF sensor as intake air because the sensor is unable to detect when reversion occurs. As a result, it is possible for a mass of air to be measured multiple times by the MAF sensor. The error leads to higher MAF estimates than actually exist.

SUMMARY OF THE INVENTION

The present invention provides an engine system having an intake manifold. An air inlet enables air flow into and out of the intake manifold. An air flow sensor is located upstream of the intake manifold and measures air flow through the air inlet. A first sensor detects a direction of the flow of air. The first sensor and the air flow sensor communicate with a controller that records the air flow through the air inlet.

In another feature, the first sensor is a differential pressure sensor that detects a pressure differential between the air inlet and the intake manifold.

In still another feature, a second sensor communicates with the air inlet and the first sensor communicates with the intake manifold. The first and second sensors detect an intake manifold pressure and an air inlet pressure to determine a pressure differential therebetween.

In yet another feature, the first sensor detects an intake manifold pressure that is compared to a calibrated barometric pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
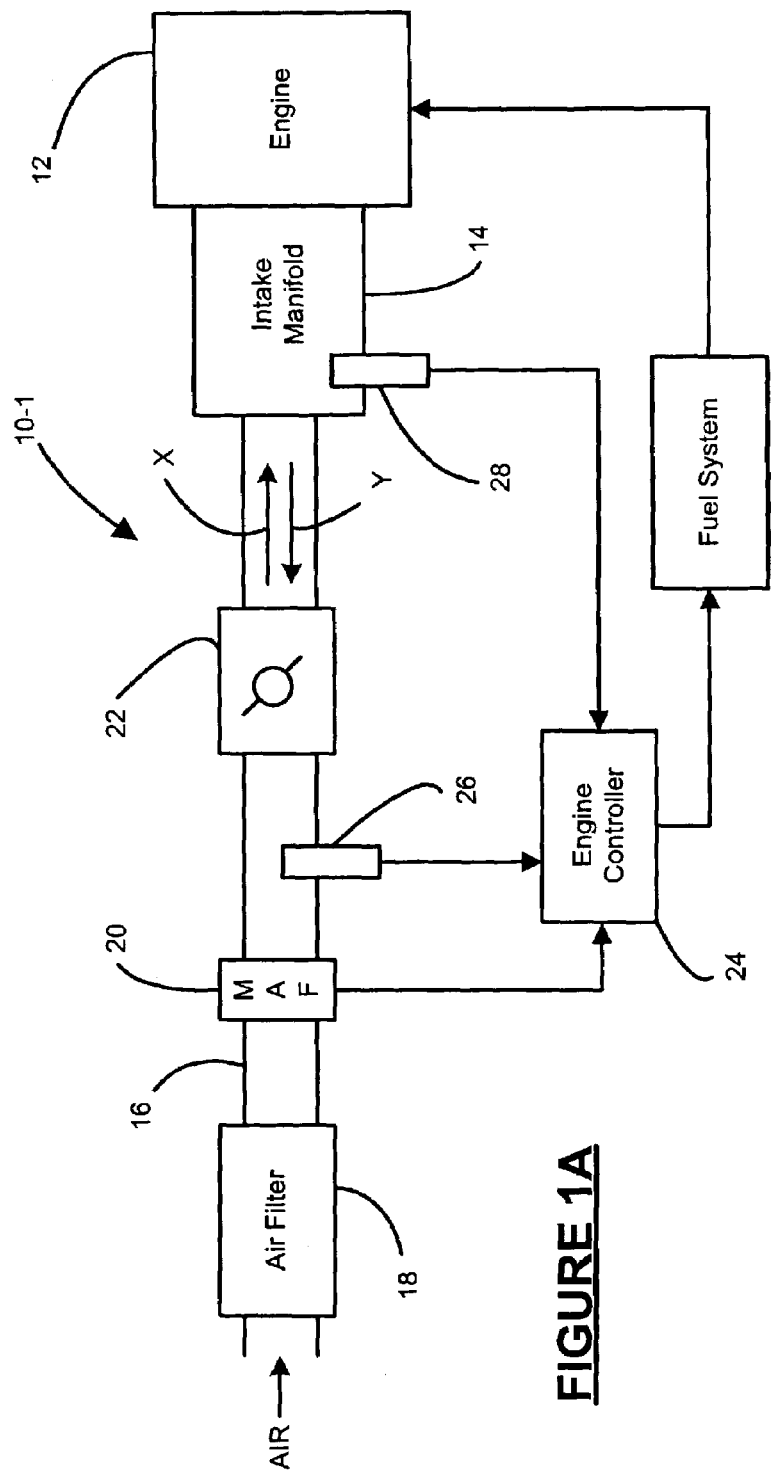
FIG. 1A is a functional block diagram of a first exemplary embodiment of an engine system of a vehicle according to the present invention.

The following description of the preferred embodiment is merely exemplary in nature and is in no way intended to limit the invention, its application, or uses. For purposes of clarity, the same reference numbers will be used in the drawings to identify similar elements.

Figure 1B:
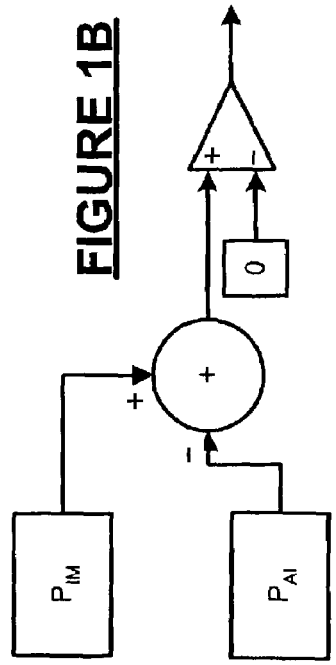
FIG. 1B is a signal flow diagram illustrating a first method for determining an air flow direction in accordance with the engine system of FIG. 1A.

With reference to FIGS. 1A and 1B, a first embodiment of an engine system 10-1 is shown. The engine system 10-1 includes an internal combustion (IC) engine 12 with an air intake manifold 14. An air inlet 16 enables a flow of air into the intake manifold 14 from an external source (e.g., atmosphere). An air filter 18, a mass air flow (MAF) sensor 20, and a throttle valve 22 are located along an inlet 16. A controller 24 communicates with the MAF sensor 20.

A first sensor 26 communicates with the air inlet 16 and senses pressure therein. A second sensor 28 communicates with the intake manifold 14 and senses pressure therein. Although the first sensor 26 is shown disposed between the MAF sensor 20 and the throttle valve 22, it will be appreciated that the first sensor 26 may be disposed anywhere along the air inlet 16. The first and second sensors 26, 28 provide pressure readings in the air intake 16 and the intake manifold 14 to the controller 24.

The air filter 18 filters air as it passes through the air inlet 16 to the engine 12 to remove damaging dirt or debris. The driver modulates the accelerator to adjust the throttle valve 22 and to regulate the amount of air flowing into the intake manifold 14. The MAF sensor 20 detects MAF through the air inlet 16 into the engine 12. The MAF is then used by the controller 24 to determine an appropriate amount of fuel to achieve a desired A/F ratio for engine operation.

The pressure signals received by the controller 24 are used to determine a direction of air flow. More particularly, a higher pressure in the intake manifold 14 indicates air flow from the intake manifold 14 to the air inlet 16. Similarly, a higher pressure in the air inlet 16 indicates air flow from the air inlet 16 into the intake manifold 14.

Referring now to FIG. 1B, the flow direction signal is determined by taking pressure readings from the intake manifold sensor 28 and the air inlet sensor 26, and by determining whether the difference between the two is positive or negative. If the difference is positive (i.e., the intake manifold pressure is greater than the air inlet pressure) then the flow is away from the intake manifold 14 (i.e., negative flow). If the difference is negative (i.e., the intake manifold pressure is less than the air inlet pressure) then the flow is into the intake manifold 14 (i.e., positive flow).

Figure 2:
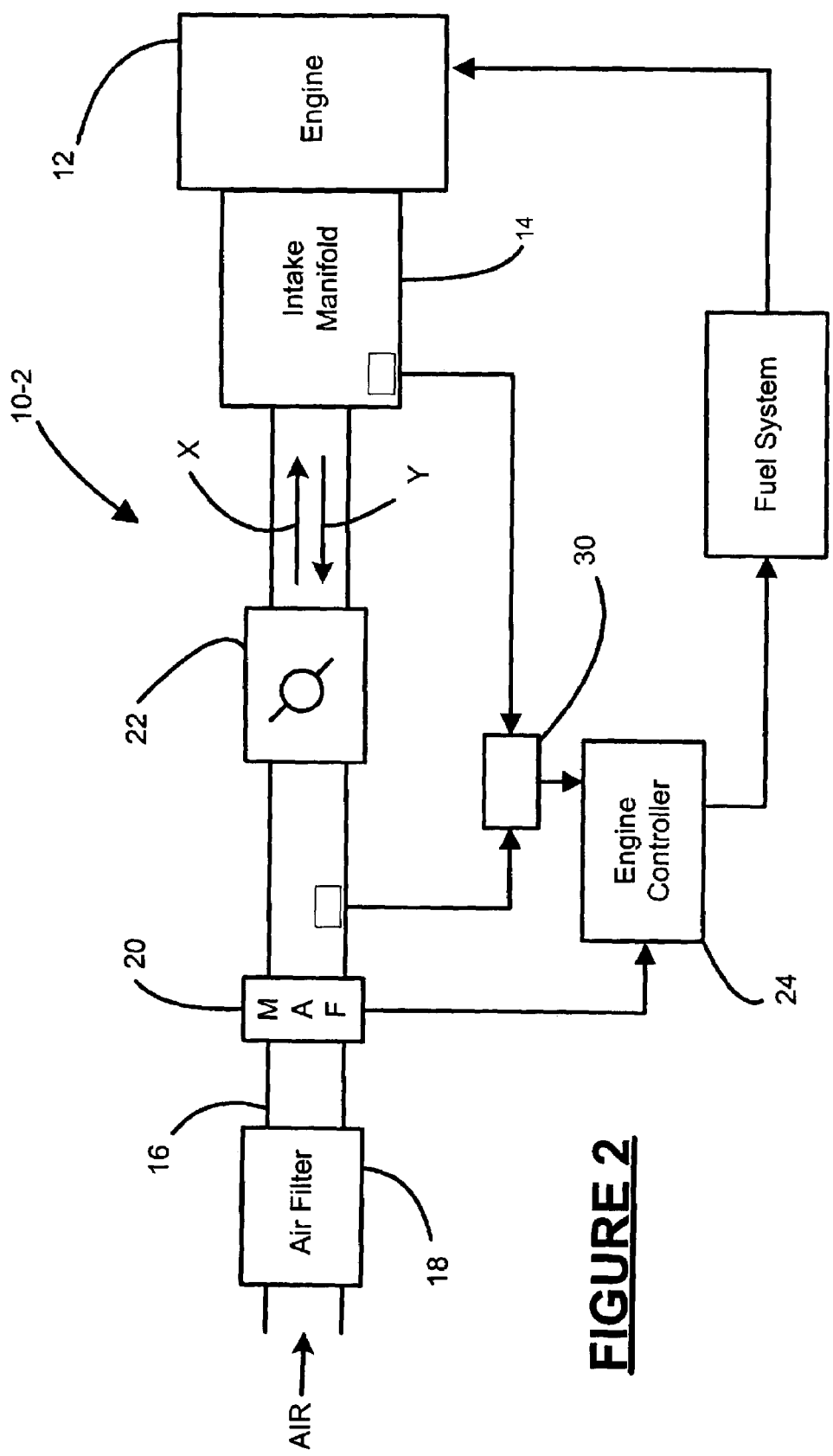
FIG. 2 is a functional block diagram of a second exemplary embodiment of an engine system of a vehicle according to the present invention.

With reference to FIG. 2, a second exemplary embodiment of an engine system 10-2 is shown. The second exemplary embodiment of the engine system 10-2 is similar to the first exemplary embodiment. However, instead of including first and second pressure sensors 26, 28, a single pressure sensor 30 is provided. The single pressure sensor 30 is preferably a differential pressure sensor that communicates with both the air inlet 16 and the intake manifold 14. The differential pressure sensor 30 is sensitive to pressure differences between the intake manifold 14 and the air inlet 16. The differential pressure sensor 30 identifies the direction of air flow and provides a differential pressure signal to the controller 24.

The pressure differential sensor 30 communicates with both the air inlet 16 and the intake manifold 14, and is sensitive to any pressure difference therebetween. If the pressure is lower in the air inlet 16 than in the intake manifold 14, the differential pressure sensor indicates negative flow. If, however, the pressure in the intake manifold 14 is greater than in the air inlet 16, the differential pressure sensor 30 indicates positive flow.

Figure 3A:
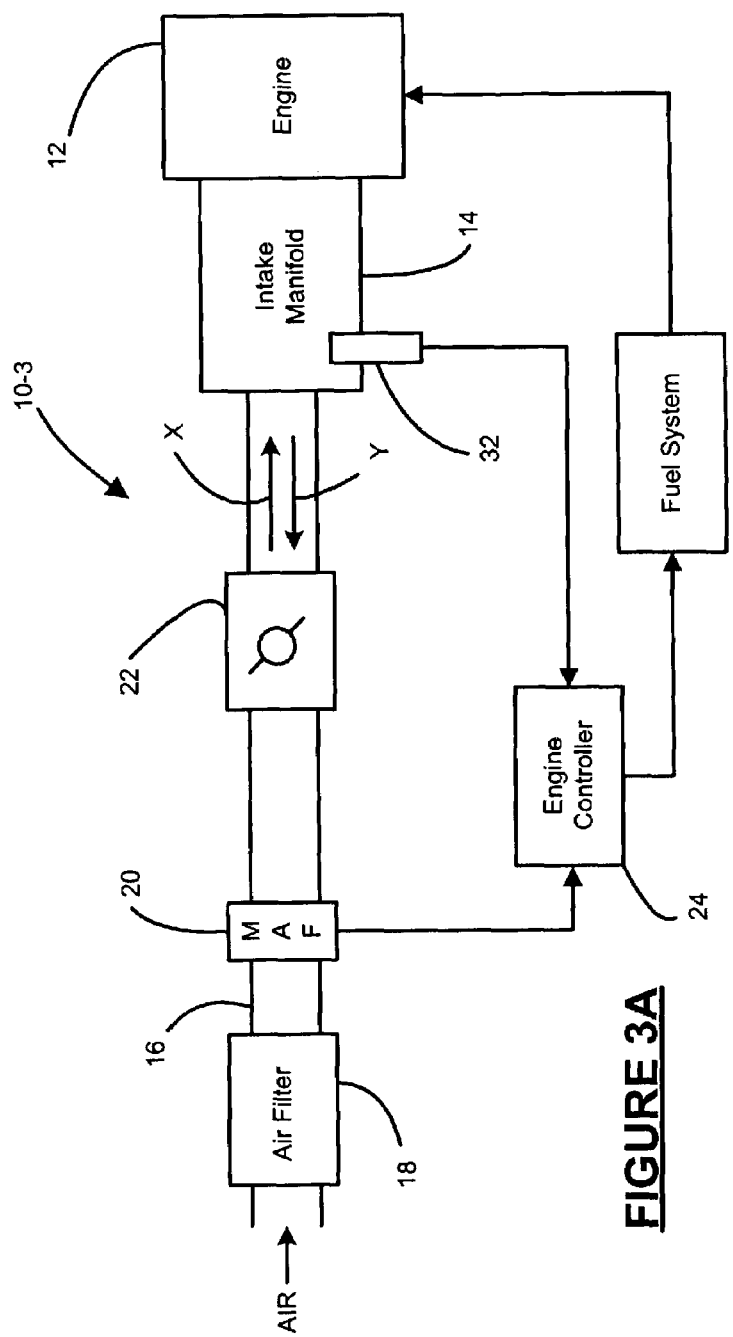
FIG. 3A is a functional block diagram of a third exemplary embodiment of an engine system of a vehicle according to the present invention.
Figure 3B:
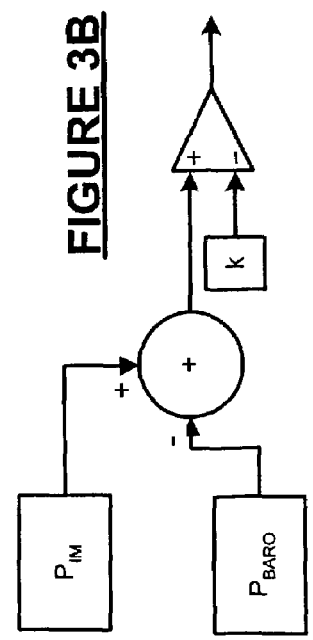
FIG. 3B is a signal flow diagram illustrating a third method for determining an air flow direction in accordance with the engine system of FIG. 3.

With reference to FIGS. 3A and 3B, a third exemplary embodiment of an engine system 10-3 is shown. The third exemplary embodiment is similar to the first and second exemplary embodiments described above. However, a single intake manifold sensor 32 is provided. As described in further detail below, the pressure measured by the intake manifold sensor 32 is compared to a calibrated value to determine the direction of air flow.

Referring to FIG. 3B, the flow direction signal is determined by comparing the intake manifold pressure to a theoretical barometric pressure. The theoretical barometric pressure is calculated by the controller 24 and is a function of the state of operation of the engine 12 including the position of the throttle valve 22. The difference between the intake manifold pressure as measured by the intake manifold sensor 32, and the theoretical barometric pressure is determined and compared to a calibration constant K. If the difference is greater than K, then negative flow is indicated. If the difference is less than K, then positive flow is indicated.

Figure 4:
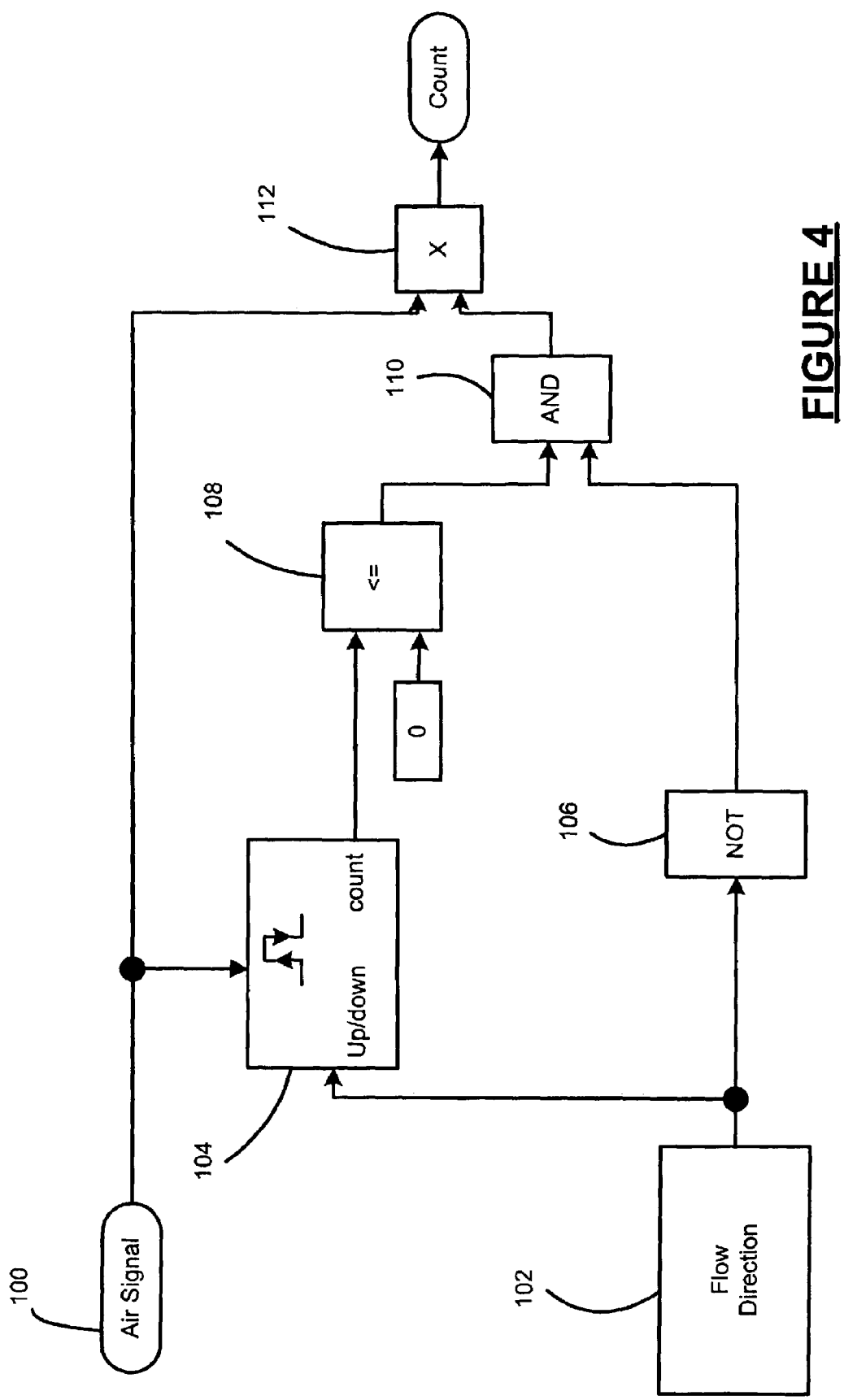
FIG. 4 is a signal flow diagram illustrating one exemplary implementation of air flow count logic according to the present invention.

Referring now to FIG. 4, an air signal 100 is output to an up/down counter 104. The air signal 100 includes a frequency that is proportional to the rate of air flow. The counter 104 integrates the air flow rate based on the flow direction signal to determine air flow mass. A flow direction signal 102 is output as described above. For example, a 0 indicates negative flow and a 1 indicates positive flow. The flow direction signal is output to the counter 104 and an inverter 106. The direction signal causes the counter 104 to either increment or decrement. More specifically, if the direction signal is negative, then the counter 104 decrements. Alternatively, if the direction signal is positive, then the counter increments. Thus, the counter 104 integrates the rate of reverted (negative) air flow to provide a mass of reverted air flow and the rate of normal (positive) air flow is integrated to provide a mass of normal air flow. The mass of reverted air flow is subtracted from the mass of normal air flow once the air flow direction changes from negative to positive. If the mass of reverted air is equal to the mass of normal air flow, a count signal of the counter 104 is zero. If the mass of reverted air is greater than the mass of normal air flow, then the count signal is negative, and if the mass of reverted air is less than the mass of normal air flow, the count signal is positive. The inverter 106 inverts the direction signal, whereby a negative flow is inverted to a positive flow and vice versa.

The count signal of the counter 104 is output to a relational operator 108. The relational operator 108 determines whether the count signal is less than or equal to zero. If true, then the relational operator 108 outputs a first state such as 1. If false, then the relational operator 108 outputs a second state such as 0. The inverter 106 provides an inverter signal corresponding to the direction signal. If the inverted direction signal is positive (i.e., the direction signal was 0), then the inverter signal is 1. If the inverted direction signal is negative (i.e., the direction signal was 1), then the inverter signal is 0.

Both the outputs of the relational operator 108 and the inverter 106 are input to an "AND" gate 110. If both are equal to 1, then the AND gate 110 outputs 1. If either or both are equal to zero, the output of the AND gate 110 outputs 0. Generally, the output of the AND gate 110 is equal to 1 if the air flow determined at 102 is positive and 0 if negative. The air signal 100 and the output of the AND gate 110 are input to a multiplier 112.

The air signal 100 is multiplied by either "1" or 0. If the air signal 100 is multiplied by 1, then the multiplier output is equal to the air signal 100. If the pulse signal is multiplied by 0, then the multiplier output is equal to 0. As a result, the controller 24 adjusts MAF for reversion. As can be appreciated, the circuits shown and described can be implemented in a variety of different ways without departing from the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine system comprising:
   an intake manifold;
   an air inlet enabling an air flow into and out of said intake manifold;
   an air flow sensor operably attached to said air inlet, and upstream of said intake manifold for measuring a flow of air through said air inlet;
   a first sensor that communicates with an intake manifold and senses a pressure therein and that is operable for detecting a direction of said flow of air; and
   a controller that estimates a barometric pressure and compares said sensed pressure to said barometric pressure to determine a direction of said air flow.

2. The engine system of claim 1 wherein said controller communicates with said air flow sensor and said first sensor.

3. The engine system of claim 1 wherein when said first sensor detects a flow of air out of said intake manifold, said air flow sensor discounts said flow of air.

4. The engine system of claim 1 further comprising a second sensor that communicates with said air inlet, and wherein said first sensor communicates with said intake manifold, said first and second sensors respectively detecting said intake manifold pressure and an air inlet pressure.

5. The engine system of claim 4 wherein said second sensor is disposed upstream of said air flow sensor.

6. The engine system of claim 5 further comprising a throttle valve upstream of said intake manifold and operable to regulate a flow of air into said intake manifold, wherein said second sensor is disposed upstream of said throttle valve.

7. An engine system comprising:
   an air flow sensor that generates an air flow signal based on air flowing through said air flow sensor;
   a first sensor that communicates with an intake manifold and senses a pressure therein and that detects a direction of said air flow flowing through said air flow sensor; and
   a controller that communicates with said air flow sensor and said first sensor, and that calculates a mass of air flow through said air flow sensor, wherein said controller estimates a barometric pressure and compares said sensed pressure to said barometric pressure to determine a direction of said air flow, and wherein said controller accounts for said air flow signal generated by air flowing in a first direction, and discounts said air flow signal generated by air flow flowing in a second direction when calculating said mass air flow.

8. The engine system of claim 7 further comprising:
   an intake manifold; and
   an air passage enabling flow of said air flow to and from said intake manifold, wherein said air flow sensor communicates with said air inlet.

9. The engine system of claim 8 wherein said first sensor communicates with said air inlet and said intake manifold and senses a pressure difference therebetween.

10. The engine system of claim 8 further comprising a second sensor that communicates with said controller, wherein said second sensor senses a pressure within said air passage, said controller determining said direction of air flow as a function of said pressures.

11. The engine system of claim 7 wherein said estimated barometric pressure is based upon an operating condition.

12. The engine system of claim 11 wherein said operating condition is based upon a position of a throttle valve.

13. The engine system of claim 7 wherein said air flow signal generated by air flow flowing in said second direction is discounted when an air flow signal changes from said second direction to said first direction.

14. A method of measuring a flow of air through an air flow sensor comprising:
   detecting a direction of air flowing through said air flow sensor by detecting an intake manifold pressure and comparing said intake manifold pressure to a calibrated barometric pressure;
   accounting for a first mass of air flowing through said air flow sensor when said first mass of air flows in a first direction; and
   discounting a second mass of air flowing through said air flow sensor when said second mass of air flows in a second direction.

15. The method of claim 14 wherein said detecting comprises:
   detecting an air inlet pressure; and
   detecting said intake manifold pressure.

16. The method of claim 15 wherein when said air inlet pressure is greater than said intake manifold pressure said air flow is flowing in said first direction.

17. The method of claim 15 wherein when said air inlet pressure is less than said intake manifold pressure, said air flow is flowing in said second direction.

* * * * *